United States Patent [19]

Boscher et al.

[11] 4,409,430
[45] Oct. 11, 1983

[54] MULTIPLE JOINT BOX

[75] Inventors: Georg Boscher, Munich; Wolfgang Haeder, Eichenau, both of Fed. Rep. of Germany

[73] Assignee: Siemens Aktiengesellschaft, Berlin & Munich, Fed. Rep. of Germany

[21] Appl. No.: 398,401

[22] Filed: Jul. 14, 1982

[30] Foreign Application Priority Data

Jul. 27, 1981 [DE] Fed. Rep. of Germany ....... 3129570

[51] Int. Cl.³ .......................................... H02G 15/013
[52] U.S. Cl. ........................................ 174/92; 156/53; 174/77 R; 174/93; 277/1
[58] Field of Search ................... 174/92, 93; 277/1, 12

[56] References Cited

U.S. PATENT DOCUMENTS

| | | | |
|---|---|---|---|
| 2,621,228 | 12/1952 | Tompers | 174/93 |
| 3,705,950 | 12/1972 | Jirka et al. | 174/93 X |
| 4,079,193 | 3/1978 | Channell | 174/93 X |
| 4,237,335 | 12/1980 | Giebel et al. | 174/92 |
| 4,267,401 | 5/1981 | Wilkinson | 174/77 R |
| 4,332,975 | 6/1982 | Dienes | 174/93 X |

FOREIGN PATENT DOCUMENTS 1130943 2/1957 France .................... 174/92

*Primary Examiner*—Laramie E. Askin
*Assistant Examiner*—Morris H. Nimmo
*Attorney, Agent, or Firm*—Hill, Van Santen, Steadman & Simpson

[57] ABSTRACT

A multiple joint box having a socket pipe and sealing bodies, the sealing bodies comprising spirally wound tape having semicircular recesses formed along its length which coincide to form circular cable apertures. The multiple joint box may be applied without the necessity of cutting or desplicing the cable.

26 Claims, 4 Drawing Figures

MULTIPLE JOINT BOX

BACKGROUND OF THE INVENTION

1. Field of the Invention

The present invention relates to a multiple joint box for connecting or distributing cable, and particularly to a multiple joint box comprising sealing bodies with a plurality of cable apertures formed in a spirally wound tape and a longitudinally slitted socket pipe.

2. The Prior Art

A multiple joint box according to the thermoplastic clamp sleeve principle is known from the German Offenlegungsschrift No. 2,736,039, which corresponds to U.S. Pat. No. 4,237,335, comprising a longitudinally slitted socket pipe with wedge-closing elements along the slit and sealing bodies at both ends of the socket pipe. The sealing bodies of the multiple joint box comprise two rigid disks with coinciding apertures formed in elastic, circular plates pressed between the rigid disks which likewise have coinciding apertures. The apertures of the elastic plates are of a smaller diameter than the apertures of the rigid disks. Furthermore, a peripheral groove is formed about the circumference of each of the sealing bodies into which sealant is inserted for sealing relative to the socket pipe. This multiple joint box, however, can be employed only with cut cables since the sealing bodies with their apertures must be slipped on over the ends of the cables. It may not be used with uncut cable or completed cable splices since the introduction of the cable into the apertures is not possible.

SUMMARY OF THE INVENTION

The present invention is directed to providing a multiple joint box or multi cable distribution sleeve assembly, that can be mounted to uncut cables or cables that have already been spliced without the necessity of cutting or desplicing the cables as well as to the method of providing a cable seal.

This task is accomplished by a novel multiple joint box having a sealing body comprising a tape wound spirally to form a disk, the thickness of the tape being at least greater than half the diameter of a cable aperture. The tape is provided with a plurality of semi-circular recesses along one side in one end area, the length of which corresponds to the circumference of the socket pipe. Recesses are provided at both sides of the tape for the remainder of its length, the spacings of said recesses being selected such that, when lying opposite one another in the tape's wound-up state, they form circular cable apertures.

The multiple joint box of the invention can be placed over uncut cables or over cable splices already finished without the need of a cable separation. To this end, sealing bodies for the end-side termination of the cable sleeve are provided for effecting a reliable seal at the already mounted cables. For that purpose, a tape is spirally wound from the center toward the outside, the tape having semi-circular recesses which mutually complement one another when the tape is wound up to form circular cable apertures and accept the cable to be introduced. Consequently, the number of cable apertures depends only on the final coupling size, i.e., on the diameter of the cable sleeve or socket pipe since the diameter of the sealing body is determined by the number of spiral tape plies.

The diameters of the cable apertures at the end faces and at specific intervals within the cable sleeve are expediently smaller than the cable diameters so that a type of sealing lip or ring is formed, thus improving sealing conditions due to the tape's flexibility and adaptability to the cable jackets. Additional sealants in the form of plastic or elastic materials may be introduced for further increasing the reliability of the sealing areas.

A positive cable support may also be achieved by means of the width of the spiral tape in the axial direction, the degree of support corresponding to the width of the spirally wound tape. In order to improve the support, additional holding elements may be disposed between the sealing lips or rings.

The spirally wound tape itself is made of flexible and windable material having plastic or elastic properties. As needed, the sealing areas may also be coated or covered with a pliable material in order to increase the sealing effect.

In order to assemble the sealing bodies, the tape is wound up spirally, whereby, during the winding, the cables are placed into the respective recesses from which apertures are being formed. In order to facilitate assembly, the spiral tape may also be made longitudinally divided. Furthermore, an assortment of tapes with a differing number of cable apertures and for different cable diameters allows an optimum matching to a particular application. Unused apertures are provided with plugs.

In order to improve the stability of the spirally wound tape, a metal tie or woven textile strip may be embedded in the tape. In this instance, the end of the textile strip extends out the end of the spiral tape and surrounds the completed spiral sealing body about its circumference, thereby increasing stability and fixing the end of the tape.

The circumferential surface of the sealing bodies may be structurally matched to any coupling device, i.e., to the corresponding shape of the socket pipe. When a particularly pressure-tight result is required, two such sealing bodies may be placed at a distance from one another. The interstice thereby formed between the two sealing bodies may be filled with suitable materials after the assembly of the socket pipe. Tensile stresses may be transmitted by longitudinal rails which are connected to the sealing bodies. When a filling material is used in the interstice between sealing bodies, it is advantageous to dispose the connecting rails in the interstice. All these described embodiments may be assembled both in vertical as well as horizontal position, so that the spatial disposition may be freely selected.

DESCRIPTION OF THE PREFERRED EMBODIMENT

Figure 1:
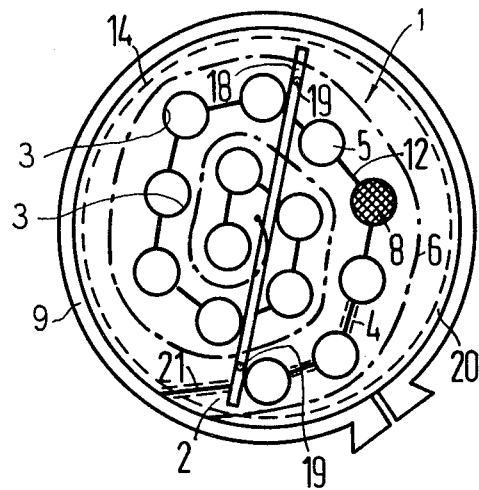
FIG. 1 is an end view of a multiple joint box of the invention showing a sealing body disposed at the end of a socket pipe.

As shown in FIG. 1, the sealing body 1 of the multiple joint box of the invention is encircled by the socket pipe 9 and is formed of a tape 2 wound spirally. Substantially semicircular recesses 3 are formed at spaced intervals in the interface 12 of the plies of the tape 2 and lie in confronting relation with one another, the recesses 3 thereby forming circular cable apertures 5. Cables can be introduced through said cable apertures 5, both in an uncut as well as in an already assembled condition, since the cable apertures 5 are divided by the interface 12. This is a particular advantage of the invention in that, for example, completed cable splices or even assembled cable sleeves may be covered with the inventive multiple joint box for further protection. Cable apertures 5 which are not used may be closed with plugs 8 which are treated during assembly in the same manner as cables.

Suitable sealing compounds 4 in plastic or elastic form may be applied as a coating or as a cover for the interface 12 as well as on the circumference of the wound up sealing body 1 in order to improve the sealing effect. It is further possible, for mechanically stabilizing the spiral tape 2 to embed a stiffening such as a metal tie or a textile strip 6, whereby the stability can be increased in the longitudinal and transverse directions. The textile strip 6 is allowed to project at the outer end of the tape 2 at a length which at least corresponds to the outer circumference of the sealing body 1. The sealing body 1 is again wound with this projection of the textile insert 6, whereby a protection against unintentional unwinding of the tape 2 is provided until a final assembly of the socket pipe 9. In addition, the individual plies of the spirally wound tape 2 can also be better sealed therewith. A groove 14 is formed in the circumferential portion of the wound tape, in which groove 14 a sealing compound can be inserted.

In order to hold the spirally wound tape sealing body together generally diametrically disposed bars 18 are attached at both sides of the sealing body by means of fasteners, such as bolts 19, thereby increasing the mechanical stability of the spirally wound tape sealing body.

Figure 2:
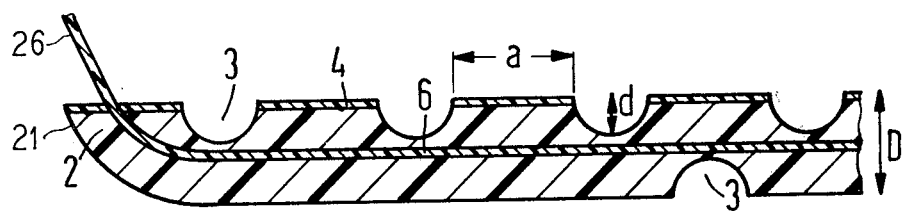
FIG. 2 is a side fragmentary sectional view of the spirally windable tape of the invention in an unwound state.

FIG. 2 shows in cross-section the structure of the spirally windable tape 2 in which a textile strip 6 has already been embedded. The tape 1 is preferably made of elastic, plastic or synthetic material. At its end 21, the tape 2 is tapered so that a gradual transition can be achieved at the outer circumference of the sealing body formed therefrom. Further, the projection 26 of the textile strip 6 as described above is shown here. At the end of the tape 2 corresponding to the outermost ply in the wound state, semi-circular recesses 3 are formed only in one side, since no cables can be introduced at the outer circumference of the sealing body 1.

In the remainder of the tape's length, recesses 3 are disposed at both sides, these ultimately complementing one another when this tape 2 is spirally wound to form cable apertures 5. The depth d of a recess 3 must be smaller than the thickness D of the spiral tape 2. When a textile strip 6 is provided, the depth d must be selected to allow clearance for the textile strip. The spacing a of the recesses 3 is determined from the requirement of having pairs of recesses 3 coincide during winding so that cable apertures are formed. A coating or cover of sealing material 4 is shown, as a result of which the sealing conditions between the individual plies of tape are improved.

Figure 3:
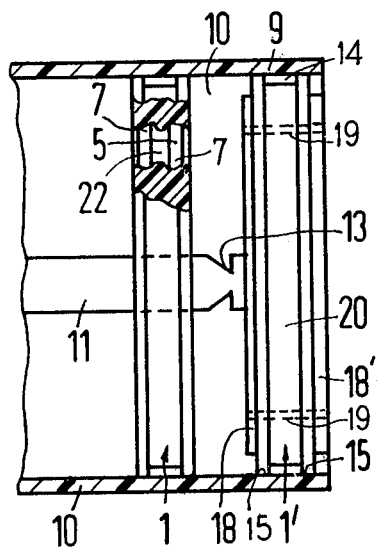
FIG. 3 is a fragmentary view, with parts in section, of a multiple joint box in the invention having two sealing bodies and an interstice lying therebetween.

As shown in FIG. 3, given particularly adverse conditions, two inventive sealing bodies 1 and 1' can be disposed behind one another in axial direction in a multiple joint box. The interstice being produced in this manner between the sealing bodies 1 and 1' can be filled with a filling material, which may be curable, so that the sealing effect is considerably improved.

As shown in a partial section of the sealing body 1, the formation of a cable aperture 5 is further illustrated. The aperture 5 is slightly restricted at both edges by means of sealing lips 7 and by means of sealing rings 22 at intervals. As a result of the lamella-like constriction produced thereby, these areas adapt particularly well and conform tightly to the introduced cable jackets and, thus, improve the sealing conditions.

Intercepting rails 11 for the bearing of tensile stresses can be introduced into the sealing areas or interstice so that a good anchoring is assured between the two end-face sealing bodies 1 and 1'. In this specific example, such an intercepting rail 11 is introduced into the interstice 10 and a special connector 13 facilitates the fastening of the rail 11 to the sealing body 1.

A separate tightening strap 20 is wrapped about the circumferential groove 14, the spirally wound tape being constricted to a smaller diameter thereby. By so doing, an increased compression against the cable is achieved. The dimensions of the groove 14, defined by ridges 15, are selected in such a manner that the tightening strap 20 is laterally confined, thus stiffening the spiral sealing body. Tightening strap 20 lies in the groove 14 to such a depth that the socket pipe 9 seals directly against the ridges 15 of the tape 2. When needed to protect against irregularities such as scratches in the socket pipe, a broad sealing tape is placed over the spirally wound tape circumference.

Figure 4:
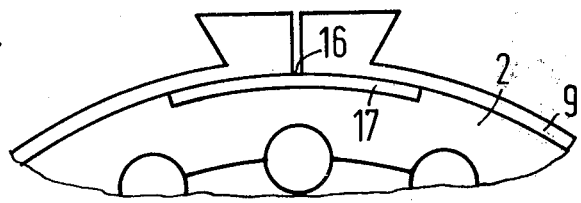
FIG. 4 is a detail fragmentary end view showing the closing area of the socket pipe longitudinal seal.

As illustrated in FIG. 4, in order to prevent the pinching of the spirally wound tape 2 in a longitudinal seal 16 of the socket pipe, a plate 17, which may be perforated, coated with sealing compound is inserted in the longitudinal seal in this area over the width of the spiral tape 2, being inserted between the spiral tape 2 and the socket pipe 9.

As best shown in FIGS. 1 and 3, in order to intercept mechanical forces, bars 18 and 18' are mounted between the cables at the inside and at the outside of the sealing body 1'. The mutual connection of the bars 18 and 18' is effected by bolts 19 which may be cast into the spiral tape 2. Due to the spacing of the bolts 19, the constriction of the spirally wound tape 2 by the tightening strap 20 is limited. The bars 18 can be mounted only given proper constriction. The bar 18 on the inside of the spiral tape sealing body 1' is provided with a device for hooking to the sealing body 1 of the incoming cable or cables. In order to improve the support of the cable, the bar 18 is non-positively connected by rail 11 to sealing body 1 of the side of the sleeve through which the incoming cable is introduced. The bars 18 and 18' further have the advantage that electrical connections such as a cable shield ground can be made with them in a simple manner. Moreover, an additional seal can ensue by means of a corresponding closing element or buckle at the termination 21 of the spirally wound tape 2.

Although various minor modifications may be suggested by those versed in the art, it should be understood that we wish to embody within the scope of the patent warranted hereon, all such modifications as reasonably and properly come within the scope of our contribution to the art.

We claim:

1. A multiple joint box having a longitudinally slitted socket pipe and at least one end-face sealing body with a plurality of cable apertures formed therein for the connecting or distributing of cables, the improvements comprising said sealing body comprising a tape wound spirally into a disk, the thickness of the tape being at least greater than half the diameter of a said cable aperture, said tape having a plurality of semicircular recesses formed at spaced intervals in one side of said tape in an end portion of said tape whose length corresponds to the circumference of said socket pipe, and a plurality of semicircular recesses formed at spaced intervals in both sides of the remaining length of said tape, the spacings of said recesses being selected such that they lie opposite one another in the wound state of said tape, thereby forming circular cable apertures.

2. A multiple joint box according to claim 1, wherein said tape is made of a plastic material.

3. A multiple joint box according to claim 1, wherein said tape is made of an elastic material.

4. A multiple joint box according to claim 1, wherein said tape is made of a flexible synthetic.

5. A multiple joint box according to claim 1, further comprising a sealing material coating the confronting wound surfaces of said tape.

6. A multiple joint box according to claim 1, further comprising annular sealing lips and sealing rings disposed about said apertures.

7. A multiple joint box according to claim 1, wherein said sealing body comprises a plurality of individual plies of spirally wound tapes.

8. A multiple joint box according to claim 1, further comprising a textile strip longitudinally embedded in said tape.

9. A multiple joint box according to claim 8, wherein said textile strip projects at the outer end of said spiral tape, the projecting portion of said textile strip encircling said sealing body over its outer circumference.

10. A multiple joint box according to claim 1, further comprising a metal tie longitudinally embedded in said tape.

11. A multiple joint box according to claim 1, wherein a plurality of sealing bodies is disposed with said sealing bodies lying behind one another in the axial direction of said sleeve.

12. A multiple joint box according to claim 11, further comprising a sealing material filling the interstice formed between two of said sealing bodies.

13. A multiple joint box according to claim 1, wherein plugs are inserted in each of said cable apertures not being used.

14. A multiple joint box according to claim 1, further comprising intercepting rails introduced into said sealing bodies.

15. A multiple joint box according to claim 14, wherein said intercepting rails have end connectors disposed in the interstice formed between two of said sealing bodies.

16. A multiple joint box according to claim 1, further comprising a tightening strap encircling and constricting said spirally wound tape.

17. A multiple joint box according to claim 1, further comprising a tightening strap encircling said spirally wound tape thereby confining and stiffening said spirally wound tape.

18. A multiple joint box according to claim 1, further comprising a groove having side ridges formed in the circumferential surface of said spirally wound tape and a tightening strap lying in said groove, whereby said socket pipe sealably bears against said ridges.

19. A multiple joint box according to claim 1, further comprising a plate coated with a sealing compound disposed between said spirally wound tape and said socket pipe slit thereby preventing pinching of said spirally wound tape.

20. A multiple joint box according to claim 1, further comprising bars overlyingly disposed at both faces of said spirally wound tape for mechanically stabilizing said spirally wound tape.

21. A multiple joint box according to claim 20, further comprising bolt means for fastening said bars to said spirally wound tape and to each other, the spacing of said bolt means thereby determining the constriction of said spirally wound tape.

22. A multiple joint box according to claim 20, wherein said bars are non-positively connected to the sealing body at the incoming cable end of said socket pipe.

23. A multiple joint box according to claim 20, further comprising means for grounding said cables over said bars and said bolt means.

24. A multiple joint box according to claim 1, further comprising a buckle means on said tightening strap overlying the outermost end of said spirally wound tape thereby sealing the confronting surfaces of said tape near said end.

25. The method of sealing a plurality of circular cables protruding from a cylindrical pipe which comprises
forming a flexible, resilient sealing tape with a thickness
at least equal to one-half the diameter of the cables to be sealed,
forming substantially semi-circular recesses on only one surface of the tape from one end of the tape toward the other a distance at least as great as the dimension of the inner circumference of said cylindrical pipe to provide a non-recessed tape surface on a portion of one surface of said tape,
forming semi-circular recesses on both surfaces of said tape along the remainder of the length of the tape,
winding the said tape about said cables such that each cable is received within complementary substantially semi-circular recesses juxtaposed with one another,
winding said non-recessed portion of said tape last to present a non-recessed tape surface exteriorly of all of the cables,
clamping a seal sleeve over the non-recessed portion of said tape to compress the wound seal tape about said cables, and
sealing said seal sleeve to the inner circumference of said pipe.

26. The method of sealing a plurality of circular cables as set forth in claim 25 wherein sealing plugs are placed within the apertures formed by mating unfilled juxtaposed semi-circular recesses in said tape in the event the number of apertures so formed exceeds the number of cables protruding from said pipe.

* * * * *